United States Patent [19]

Herbenar et al.

[11] 3,890,052
[45] June 17, 1975

[54] WEAR INDICATING JOINT ASSEMBLY

[75] Inventors: Edward J. Herbenar; Sylvester S. Mazur, both of Detroit, Mich.

[73] Assignee: TRW Inc., Cleveland, Ohio

[22] Filed: Apr. 16, 1973

[21] Appl. No.: 351,601

[52] U.S. Cl. ............ 403/27; 403/36; 403/138
[51] Int. Cl. ................................ F16c 11/06
[58] Field of Search ....... 403/27, 36, 138, 137, 140; 184/1 C; 308/1 A

[56] References Cited
UNITED STATES PATENTS

| 3,041,094 | 6/1962 | Herbenar | 403/130 X |
| 3,389,928 | 6/1968 | Wehner | 403/36 |
| 3,464,723 | 9/1969 | Herbenar | 403/140 |
| 3,791,748 | 2/1974 | Goodrich, Jr. et al. | 403/27 |

FOREIGN PATENTS OR APPLICATIONS

| 456,942 | 11/1936 | United Kingdom | 403/137 |

Primary Examiner—Andrew V. Kundrat

[57] ABSTRACT

A ball and socket joint for automotive wheel suspensions and steering linkages having an indicator covered by a lubricating fitting for the joint showing the amount of wear of the joint parts by the extent of projection from the joint housing. The lubricant fitting is easily removed to expose the indicator for visual inspection of the worn condition of the joint assembly.

7 Claims, 4 Drawing Figures

PATENTED JUN 17 1975 3,890,052
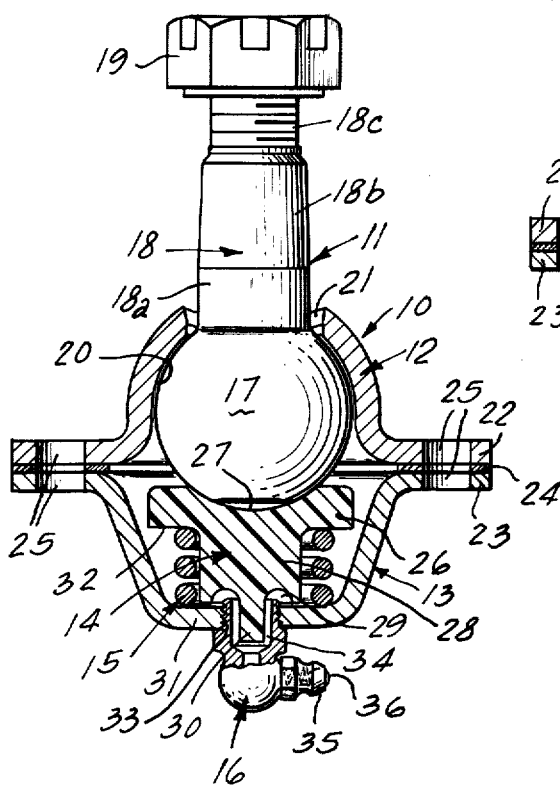
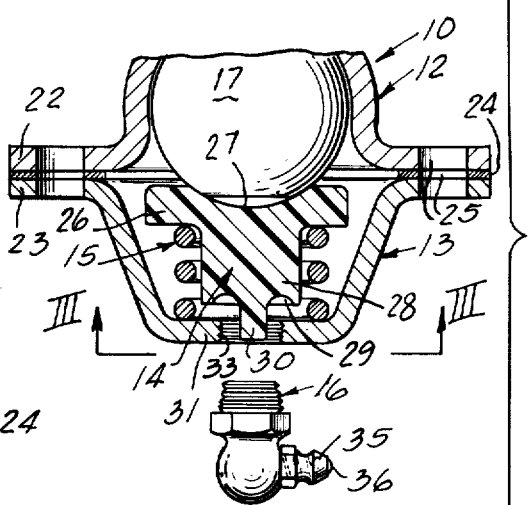
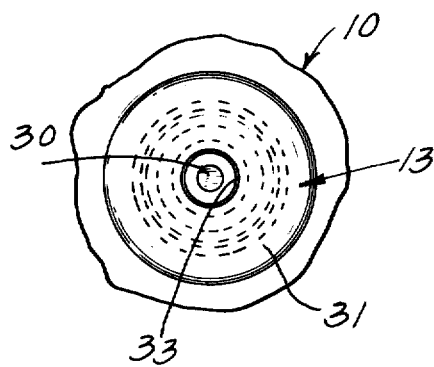
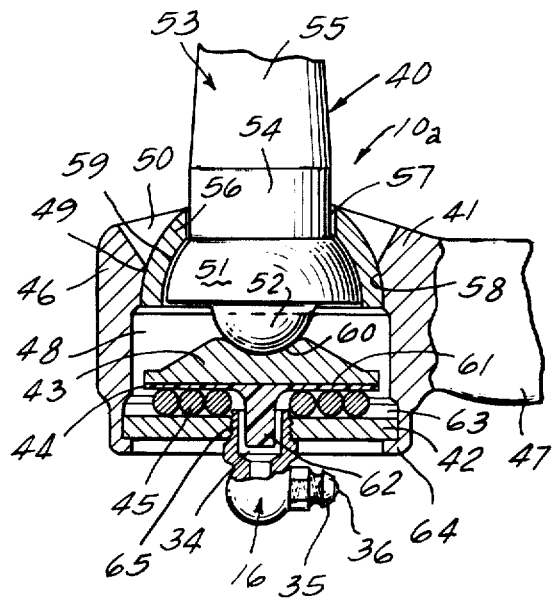

WEAR INDICATING JOINT ASSEMBLY

RELATED APPLICATION

This application is related to the Edward J. Herbenar and Kenneth R. Pozolo U.S. Pat. application, Ser. No. 279,481, filed Aug. 10, 1972 entitled, "Wear Indicating Joint", now U.S. Pat. No. 3,813,178 issued May 28, 1974, the disclosure of which is incorporated herein by reference.

FIELD OF THE INVENTION

This invention relates to improved wear indicators for joints such as ball and socket joints used in automotive wheel suspension and steering linkages and particularly relates to a ball and socket joint wear indicator which is protected by a lubricating fitting.

DESCRIPTION OF THE PRIOR ART

Heretofore, inspection of ball joints in automotive steering linkages and wheel suspensions involved rather haphazard manual shaking of the arms or linkages connected by the joints. If little or no looseness was detected, the linkages passed inspection. This inspection system failed to detect joints that would be worn out before a next scheduled inspection, frequently overlooked worn out joints because of apparent tightness created by other components in the linkage and, of course, since the test was based on "feel," judgment errors were quite high.

SUMMARY OF THE INVENTION

This invention now eliminates judgment errors in joint inspections and protects a visual wear indicator showing the condition of the joint components in the joint housing.

According to this invention the ball end of a ball stud is supported in a joint housing or socket on a load-carrying bearing ring or cup portion of the housing. The portion of the housing opposite the bearing is closed by a cup-like cap or a flat plate or disk. A wear take-up bearing and spring seat in the housing is urged against the ball end of the stud by a spring. This wear take-up bearing has a protrusion extending through an aperture in the closure cap or plate for the housing. The degree of projection of this protrusion portion beyond the closure member indicates the position of the wear take-up bearing in the housing and since the spring means continually urges the wear take-up bearing against the ball, wear of the bearing or the ball permits the spring to move the bearing further into the housing decreasing the projection distance of the protrusion portion of the bearing. Thus the level of the end of the protrusion relative to the closure member gives an immediate visual inspection of the degree of wear of the bearing or the ball from outside of the housing.

The invention is particularly concerned with the protection of the protrusion portion and with the sealing of the joint housing by a grease fitting threaded into the closure member of the housing and surrounding the protrusion portion in spaced relation to accommodate relative movement and flow of grease therebetween. The lubricant fitting is easily unscrewed from the housing to expose the protrusion portion showing the extent of its projection from the housing to indicate the amount of wear of the joint components in the housing. The arrangement is preferably such that when the joint components are worn sufficiently to require replacement, the protrusion portion will be flush with the joint housing.

Thus, the lubricant fitting serves a multiple function purpose of protecting the wear indicator, sealing the housing, and feeding grease or other lubricant to the housing.

In a preferred embodiment, the ball end of a ball stud is seated in a ball housing, which may be stamping or a forging, on a fragmental spherical bearing seat provided by the housing or by a bearing member in the housing. The shank of the stud projects freely from an opening in the housing so that the stud may tilt relative to the housing. A closure member for the housing may have a cup shape or may be a flat disk. The closure member has a threaded aperture receiving a grease fitting. A combination spring seat and bearing member in the housing is spring pressed against the ball end of the stud and has an extension in the form of a stem projecting therefrom into the lubricant fitting. The stem is of smaller diameter than the chamber of the fitting into which it projects so as not to interfer with grease flow to the interior of the housing. When the joint components are in an "as new" condition, the stem will project beyond the outside surface of the cover or closure plate so as to be clearly visible when the lubricant fitting is removed. When the joint components are in a worn-out condition, the stem will be flush with or retracted into the cover or closure plate.

The lubricant fitting may be replaced with another type of cap or nipple receiving the stem and sealing the joint housing.

It is then an object of this invention to protect and seal visual inspection means for indicating the amount of wear in joint assemblies.

Another object of the invention is to provide a ball and socket joint assembly with a wear indicator projecting into a grease fitting.

A further object of the invention is to seal and protect wear indicators of the type disclosed and claimed in the related application, Ser. No. 279,481, filed Aug. 10, 1972 with grease fittings and the like members detachably secured to the joint housings.

A specific object of the invention is to provide a ball and socket joint wear indicator having a stem projecting from the joint housing into a lubricant fitting threaded on the housing.

Other and further objects of this invention will become apparent to those skilled in this art from the following detailed description of the annexed sheet of drawings which by way of preferred embodiments show two examples of the invention.

AS SHOWN ON THE DRAWINGS

FIG. 1 is a vertical cross sectional view, with parts in elevation, of a ball and socket joint equipped with a wear indicator and lubricant fitting according to this invention and showing the relative positions of the joint components when the joint is in an "as new" condition;

FIG. 2 is a partial view similar to FIG. 1 but showing the positions of the joint components when the joint is worn and showing the grease fitting in a detached position for exposing the wear indicator;

FIG. 3 is a fragmentary bottom plan view along the line III—III of FIG. 2;

FIG. 4 is a view similar to FIG. 1 but illustrating another embodiment of the invention.

BRIEF DESCRIPTION OF THE PREFERRED EMBODIMENTS

The ball and socket joint 10 of FIGS. 1 to 3 is especially suited for an automobile wheel suspension. The joint 10 has a metal ball stud 11, a stamped metal housing cup 12, a stamped metal closure cap 13, a plastic combination spring seat and bearing 14, a coil spring 15 between the cap 13 and member 14, and a grease fitting 16 threaded in the bottom of the cap 13.

The ball stud 11 has a full ball end 17 in the housing 12, a shank 18, projecting from the ball end 17, and a nut 19 threaded on the end of the shank.

The housing cup 12 has a socket defining portion providing a fragmental spherical bearing wall 20 receiving the ball end 17 in bearing engagement therewith and converging to an aperture 21 which freely receives a cylindrical portion 18a of the stud 18 therethrough. This cylindrical portion extends to a tapered portion 18b which converges to a threaded end portion 18c receiving the nut 19.

The housing 12 has an out-turned base flange 22 on the end thereof opposite the aperture 21. The closure cap 13 has an out-turned flange 23 mating with the flange 22. A gasket 24 is provided between the flanges 22 and 23 and aligned apertures 25 are provided in the flanges 22 and 23 to receive fasteners (not shown) for securing the housing 12 and cap 13 which are welded together to the arm.

The member 14 has a head 26 with a fragmental spherical recess 27 in the top face thereof receiving the bottom of the ball end 17. A cylindrical boss portion 28 depends or descends centrally from the head 26 and has a groove 29 in the bottom end thereof surrounding a stem 30 which projects beyond the bottom to provide the wear indicator as will be hereinafter more fully described.

The spring 15 surrounds the boss 28, is bottomed on the flat bottom 31 of the cap 13 and acts on the underside 32 of the head 26 to urge the member 14 against the ball end 17 with the recess 27 in bearing engagement with the ball end.

The bottom 31 of the cap 13 has a central threaded aperture or hole 33 into which the lubricant fitting 16 is threaded. This fitting 16 has a recess or well 34 of larger diameter than the stem 30 and freely receiving the stem therein. The fitting has a grease gun receiving nozzle 35 closed by a spring loaded ball 36 which is adapted to be depressed by a lubricant gun to permit flow of grease into the fitting, through the well 34, into the groove 29 and under the member 14 to the interior of the cap 13.

In the "as new" condition of the joint components as shown in FIG. 1, the ball end 17 is seated against the bearing wall 20 of the housing 12 and is urged into place by the member 14 which is spring loaded against the ball end 17 by the spring 15. The stacked height of the parts is such that the stem 30 of the member 14 will project beyond the bottom 31 of the cap 13 and will be clearly visible when the lubricant fitting is removed.

When the joint components are worn, their stacked height will be lessened and the spring 15 will urge the member 14 further into the cap 13. When the joint parts reach a "worn-out" condition indicating that the joint should be replaced, the level of the stem 30 will be retracted in the cap member 13 so that its bottom end will be about flush with the bottom 31 of the cap as shown in FIG. 2.

It will, of course, be noted that the lubricant fitting 16 protects the stem 30 and seals the interior of the joint housing against loss of lubricant or ingress of extraneous matter. This fitting 16 is easily unscrewed from the bottom 31 of the cap 13 to expose the stem 30 and a visual inspection of the level of this stem relative to the bottom 31 of the cap will indicate the amount of wear of the joint components.

The stem 30 may conveniently project about .10 inches beyond the bottom 31 of the cap 13 in the "as new" condition of the joint and may be flush with this bottom 31 in the "worn-out" condition of the joint.

The combination spring seat and bearing member 14 can be metal but is preferably a plastics material having some shock absorbing or resilient characteristics such as an acetal resin, nylon, a polyolefin, or the like.

The embodiment 10a of FIG. 4 is a tie rod end or steering linkage ball and socket assembly including a stud 40 with a half ball end, a forged housing 41, a closure disk 42, a metal spring seat 43, a plastics wear indicator member 44, and a flat helical spring 45. The joint assembly 10a includes the same lubricant fitting 16 as the assembly 10.

The forged housing 41 has an eye end 46 with a projecting stem 47. The eye end 46 provides a cylindrical chamber 48 intermediate the ends thereof with a fragmental spherical bearing wall 49 converging from the top of the chamber to a reduced opening 50.

The stud 40 has a head 51 of about half ball shape with a depending rounded button 52 extending from the bottom thereof. A stud shank 53 extends from the head 51 and has a cylindrical portion 54 at the small end of the head extending to a tapered shank portion 55.

A metal bearing shell 56 is seated on the stud head 51 and receives the cylindrical shank portion 54 through a top aperture 57 thereof. The shell 56 has an external fragmental spherical bearing wall 58 seated on the bearing wall 49 of the housing and an internal bearing wall 59 seated on the head 51 of the stud. The stud can thus rotate in the shell 56 and the shell 56 can tilt on the bearing wall 49 of the housing so that the stud is rotatable and tiltable relative to the housing.

The spring seat 43 fits freely in the cylindrical portion 48 of the eye end 46 of the housing and has a fragmental spherical recess 60 receiving the button 52 of the stud. The seat 43 has a flat base 61 receiving the plastics member 44 thereagainst. This member 44 has a central stem 62 depending therefrom into the lubricant fitting 16.

The closure disk 42 is seated in a counterbore 63 of the eye 46 beneath the chamber 48 and is pressed against the spring 45 by a spun over rim or lip 64 on the bottom of the eye. The lubricant fitting 16 is threaded into a central hole 65 in this closure disk 42.

As in the assembly 10, the stem member 62 of the assembly 10a projects freely into the chamber or well 34 of the lubricant fitting 16 and in the "as new" condition of the assembly 10a, the stem will project beyond the bottom of the closure disk 42. When the joint components of the assembly 10a have worn sufficiently to require replacement of the joint assembly, the spring 45 will have moved the seat 43 further into the chamber 48 and the stem 62 will be retracted flush with or inwardly from the bottom face of the closure disk 42.

Therefore, removal of the lubricant fitting 16 to check the level of the stem 62 will give a quick visual inspection of the condition of the joint components. The lubricant fitting 16 of the embodiment 10a serves the same function as in the embodiment 10 of protecting the wear indicator, sealing the joint housing, and feeding lubricant to the joint components.

From the above descriptions it should therefore be clear that this invention provides improvements in wear indicators for joint assemblies by protecting the indicators and sealing the joint housings with a lubricant fitting or the like cover.

We claim as our invention:

1. A joint construction comprising a housing, a stud member having a shank projecting from the housing and a head in the housing, bearing means supporting the head in the housing, wear takeup means in the housing engaging the stud head, a rigid stem on said wear takeup means projecting from the housing, a lubricant fitting removably mounted on the housing freely receiving the rigid stem and providing a lubricant passage around the stem, and said fitting when mounted on the housing protecting said stem and sealing the housing and when removed from the housing exposing said stem for a reading of the wear conditions of said bearing means and stud head.

2. The joint construction of claim 1 wherein the lubricant fitting has a grease gun receiving nozzle, a spring loaded ball closes said nozzle, and the rigid stem on the wear takeup means is surrounded by a groove receiving lubricant from the fitting.

3. The joint construction of claim 1 wherein the wear takeup means is a one-piece member with a head having a recess receiving the head of the stud, a boss portion depending from said head, and said rigid stem depends from said boss portion.

4. A ball and socket joint construction comprising a housing having a ball seat therein at one end thereof, a stud having a ball end seated on said ball seat and a shank extending from the housing, a spring seat in said housing, a wear takeup spring urging said spring seat against the ball end of the stud to urge the ball end of the stud into bearing engagement with said ball seat, a rigid stem on said spring seat extending freely through the end of the housing opposite said ball seat, a lubricant fitting removably mounted on said opposite end of the housing embracing said rigid stem in spaced relation therewith and providing a lubricant passageway around said stem communicating with the interior of said housing to supply lubricant from the fitting to the ball seat, the ball end of the stud, and the spring seat, said lubricant fitting when mounted on said opposite end of the housing sealing said housing and when removed from said housing exposing said stem, and said stem having a length projecting beyond the housing before the joint components reach a worn-out condition and being retracted into the housing by said spring when the joint components are worn out.

5. The ball and socket joint of claim 4 wherein said opposite end of the housing is a closure disk and the lubricant fitting is threaded into said disk.

6. The ball and socket joint construction of claim 4 wherein said opposite end of the housing is a metal cup receiving the spring seat and wear takeup spring and the lubricant fitting is threaded into the bottom of said cup.

7. In a joint construction having a housing, wearable components in the housing, wear take-up means for said components, and a rigid wear indicator readable from outside of the housing, the improvement of a removable lubricant fitting threaded into the housing freely receiving the rigid wear indicator and sealing the housing while providing a lubricant passageway around the rigid wear indicator communicating with the wearable components in the housing, and said fitting being removable from the housing to expose the rigid wear indicator for a reading of the wear conditions of the wearable components in the housing.

* * * * *